United States Patent
Ferguson

(10) Patent No.: US 10,967,934 B2
(45) Date of Patent: Apr. 6, 2021

(54) ELECTRIC DRIVE WHEEL HUB SYSTEM FOR A VEHICLE AND A VEHICLE INCORPORATING THE SAME

(71) Applicant: WILLIAMS ADVANCED ENGINEERING LIMITED, Oxfordshire (GB)

(72) Inventor: Gavin Ferguson, Oxfordshire (GB)

(73) Assignee: WILLIAMS ADVANCED ENGINEERING LIMITED, Oxfordshire (GB)

( * ) Notice: Subject to any disclaimer, the term of this patent is extended or adjusted under 35 U.S.C. 154(b) by 512 days.

(21) Appl. No.: 15/536,835

(22) PCT Filed: Dec. 16, 2015

(86) PCT No.: PCT/GB2015/054035
§ 371 (c)(1),
(2) Date: Jun. 16, 2017

(87) PCT Pub. No.: WO2016/097725
PCT Pub. Date: Jun. 23, 2016

(65) Prior Publication Data
US 2017/0334516 A1    Nov. 23, 2017

(30) Foreign Application Priority Data
Dec. 17, 2014  (GB) .................................. 1422428.1

(51) Int. Cl.
*B62M 6/65*     (2010.01)
*B62M 6/60*     (2010.01)
(Continued)

(52) U.S. Cl.
CPC ................. *B62M 6/65* (2013.01); *A61G 5/04* (2013.01); *A61G 5/041* (2013.01); *B62M 6/90* (2013.01);
(Continued)

(58) Field of Classification Search
CPC . B62M 6/65; B62M 6/60; B62M 6/40; B62M 11/16; B62M 11/14; A61G 5/04;
(Continued)

(56) References Cited

U.S. PATENT DOCUMENTS 552,271 A * 12/1895 Bolton, Jr. ............... B62M 7/12
                                                          180/220
5,327,034 A    7/1994 Couture et al.
(Continued)

FOREIGN PATENT DOCUMENTS

CN    201824790 U    5/2011
CN    102148557 A    8/2011
(Continued)

OTHER PUBLICATIONS

International Search Report for PCT/GB2015/054035, dated Feb. 23, 2016.
(Continued)

*Primary Examiner* — Edgardo San Martin
(74) *Attorney, Agent, or Firm* — Lando & Anastasi, LLP

(57) ABSTRACT

A vehicle having an electrical drive wheel hub system (30) and the hub system incorporated in the vehicle has a wheel hub (18) driven by an electric motor (31) formed by a brushless DC motor having stators (40) and rotors (42). The electric motor is arranged to drive an epicyclic gear system (32) which provides a reduction gear arrangement to drive the hub (18). Located entirely within the periphery of the stator is power circuitry and control circuitry for the electric motor, the circuitry being provided on toroidal printed circuit boards (70, 71).

18 Claims, 8 Drawing Sheets

Figure 1:
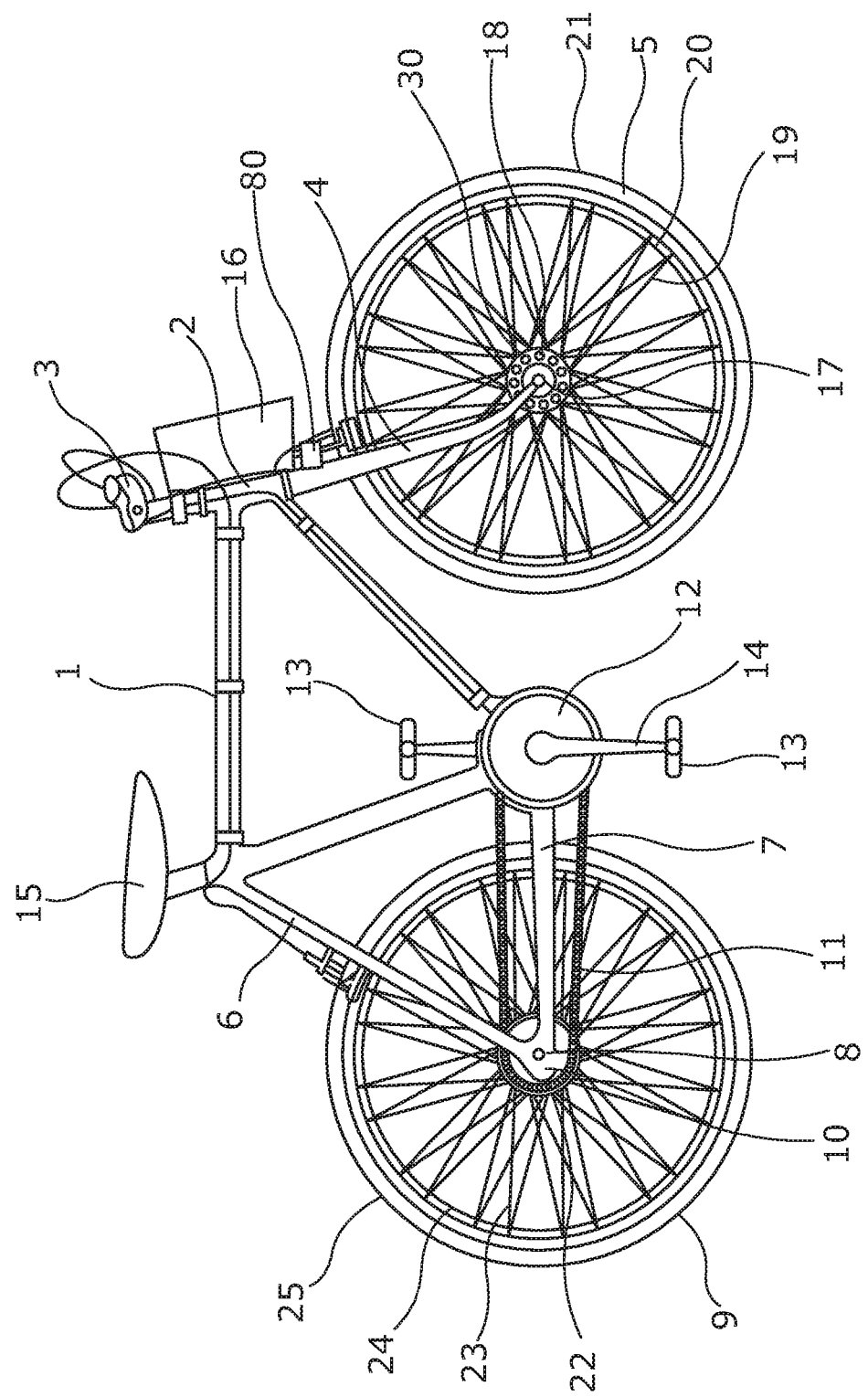

(51) Int. Cl.
  *B62M 11/16* (2006.01)
  *B62M 11/14* (2006.01)
  *H02K 11/33* (2016.01)
  *H02K 11/30* (2016.01)
  *H02K 7/116* (2006.01)
  *A61G 5/04* (2013.01)
  *B62M 6/90* (2010.01)

(52) U.S. Cl.
  CPC ............ *B62M 11/16* (2013.01); *H02K 7/116* (2013.01); *H02K 11/33* (2016.01)

(58) Field of Classification Search
  CPC ........ H02K 11/33; H02K 11/30; H02K 7/116; H02K 7/14; H02K 1/06; H02K 1/16; H02K 1/27; B60K 7/00; B60K 7/0007; B60K 2007/0038
  See application file for complete search history.

(56) References Cited

U.S. PATENT DOCUMENTS

| | | | |
|---|---|---|---|
| 5,600,191 A | 2/1997 | Yang | |
| 5,857,537 A * | 1/1999 | Matsumoto | B62M 6/60 180/206.5 |
| 6,104,112 A * | 8/2000 | Vanjani | H02K 11/33 310/64 |
| 8,657,047 B2 * | 2/2014 | Urabe | B62M 6/65 180/65.51 |
| 8,720,622 B2 * | 5/2014 | Ito | B62M 6/65 180/65.51 |
| 10,391,853 B2 * | 8/2019 | Takemoto | H02K 5/1732 |
| 2004/0160141 A1 | 8/2004 | Dube | |
| 2006/0070778 A1 | 4/2006 | De Veny et al. | |
| 2011/0259658 A1 * | 10/2011 | Huang | B60K 1/04 180/65.51 |
| 2012/0206004 A1 | 8/2012 | Wishart | |
| 2013/0257327 A1 | 10/2013 | Dhawan | |
| 2017/0334512 A1 * | 11/2017 | Capozzella | B62M 6/55 |

FOREIGN PATENT DOCUMENTS

| | | | | |
|---|---|---|---|---|
| CN | 202624889 U | 12/2012 | | |
| CN | 103979050 A | 8/2014 | | |
| CN | 203888963 U | 10/2014 | | |
| DE | 3632781 A1 | 3/1988 | | |
| EP | 0968911 A1 | 1/2000 | | |
| EP | 1137154 A1 | 9/2001 | | |
| JP | H0999885 A | 4/1997 | | |
| JP | H09169290 A | 6/1997 | | |
| JP | 2000083349 A | 3/2000 | | |
| JP | 2002-321683 A | 11/2002 | | |
| JP | 2003095180 A | 4/2003 | | |
| JP | 2008-044414 A | 2/2008 | | |
| JP | 3154782 U | 10/2009 | | |
| JP | 2015033907 A | 2/2015 | | |
| WO | 9425333 A1 | 11/1994 | | |
| WO | WO-2011013583 A1 * | 2/2011 | .......... | B60L 15/2045 |
| WO | 2012117641 A1 | 9/2012 | | |
| WO | 2012126163 A1 | 9/2012 | | |
| WO | WO-2013004409 A1 * | 1/2013 | .......... | B60K 7/0007 |
| WO | 2013071436 A1 | 5/2013 | | |

OTHER PUBLICATIONS

Combined Examination and Search Report for UK Application No. GB 1522217.7, dated Feb. 15, 2016.
Search Report for UK Application No. GB1422428.1 dated Mar. 23, 2016.
Communication Pursuant to Article 94(3) EPC in European Patent Application No. 15813535.0 dated Feb. 26, 2020.
Second Office Action in Chinese Patent Application No. 201580076370.6 dated Jul. 9, 2019.
Third Office Action in Chinese Patent Application No. 20150076370.6 dated Apr. 9, 2020.
Office Action in Japanese Patent Application No. 2017-551375 dated Aug. 4, 2020.
First Office Action in Japanese Patent Application No. 2017-551375 dated Aug. 20, 2019.

* cited by examiner

ELECTRIC DRIVE WHEEL HUB SYSTEM FOR A VEHICLE AND A VEHICLE INCORPORATING THE SAME

CROSS-REFERENCE TO RELATED APPLICATIONS

This application is a U.S. national stage application and claims the benefit under 35 U.S.C.§ 371 of PCT/GB2015/054035, titled AN ELECTRIC DRIVE WHEEL HUB SYSTEM FOR A VEHICLE AND A VEHICLE INCORPORATING THE SAME, filed Dec. 16, 2015, which claims priority to British Patent Application No. 1422428.1 filed Dec. 17, 2014, which is hereby incorporated herein by reference in its entirety for all purposes.

This invention relates to a vehicle having an electric drive wheel hub system and to the system incorporated therein. It also relates to an electric drive wheel hub assembly for such a vehicle.

It is known to provide vehicles, such as cars, motorcycles, invalid carriages, scooters, and wheel chairs with battery, hybrid or fuel cell electrical drive systems and it is also known to provide pedal bicycles with electrical power which may provide full or partial drive assistance. Most power assisted bicycles require the riding cyclist to provide power to the pedals and an electric motor is used to provide top-up power assistance to drive the bicycle. These bicycles are generally known as pedelecs.

Electric drive hub systems are known where a direct drive electric motor is located within a wheel hub and an early example is disclosed in U.S. Pat. No. 552,271. Such early systems required brush commutation, but with the advent of brushless DC motors controlled by an inverter or by pulse width modulation (PWM), greater efficiency has been achieved.

WO2013/004409 discloses a direct drive electric motor with an inverter fitted into the wheel hub of an electric vehicle that is suitable for application to a goods vehicle, motor car or motorcycle. Electronic commutation is usually provided by a micro-controller.

Hub motors have an annular rotor with permanent magnets, and inner stator phase windings mounted onto a toroidally shaped hub. PWM is used to control the phases of the motor, whereby the mark-space ratio of the modulation controls the speed of the motor and such control is known from, for example, WO2011/013583.

Thus, to control the speed and power of the motor, each pulse is increased or reduced in width and each electrical phase of the motor (which may be three or five phase) is driven accordingly. This means that a three phase electric motor, including electrical feed, winding temperature and rotational speed and position sensors, requires a minimum of twelve or fourteen individual connections between the control unit, battery and inverter into the motor. This results in a bulky cable of large diameter which has, by necessity, to pass through the wheel spindle and locating nut to the motor.

Such a bulky cable provides potential for damage or failure of the wiring and it is not uncommon for the cable length to be one or one and a half metres extending from the battery or inverter to the motor, and the transmission of high frequency PWM switched power over such a long length can create electrical interference with other components, induce high voltages into conductors and reflective waves may induce high currents or voltages, creating damage or interference with control logic circuits.

Moreover, in bicycles, for example, space limitations between the front or rear forks restricts the available space within which to locate an electric hub motor. Standard size bicycle hubs, for example, are often 100 mm wide and folding cycles are often smaller at 74 mm which severely limits the application of hub motors. In many instances, this has meant that hub motors are fitted into non-standard spacing of the forks, requiring modified or converted replacement forks. Replacement or modified forks are expensive to produce and limit the acceptability of converting existing bicycles to electric drive. Furthermore, direct drive hub motors tend to be large and are heavy and, although they may be acceptable for location in the rear wheel of a standard size bicycle, they are unpleasantly heavy and unsightly when located in the front wheel of a bicycle.

Direct drive motors, although powerful, are limited in rotational speed by the size of the wheel and maximum speed of the vehicle. This means that such electric motors are usually running below their efficient speed for both power and electrical energy efficiency. Direct drive motors for a given power output are also significantly larger in diameter compared to an equivalent geared drive motor.

The present invention seeks to at least partially mitigate the foregoing difficulties.

According to a first aspect there is provided an electric drive wheel hub assembly for an electrically assisted vehicle comprising a wheel hub housing an electric motor which includes a stator and a rotor rotatable about the stator, wherein power circuitry and control circuitry for the electric motor is located within the periphery of the stator.

The electric motor may comprise a brushless DC motor, and the wheel hub assembly may include an epicyclic reduction gear assembly arranged to be driven by said brushless DC motor to rotate said wheel hub.

The epicyclic gearbox may comprise a sun gear secured to the rotor, a set of planetary gears and a ring gear secured to the wheel hub, thereby transferring torque from the rotor to the wheel hub.

The power circuitry may include an inverter or a pulse width modulator (PWM) circuit mounted on a mounting means located about said spindle and completely within the confines of said stator.

The mounting means may be toroidal and may comprise a printed circuit board (PCB). Other shapes may be provided of course to fit in the available space.

The hub assembly may include commutation circuitry for the motor comprising a micro-controller which may be mounted on said printed circuit board for the power circuitry or on a further toroidal printed circuit board, also located about said spindle and completely within the confines of said rotor. The micro-controller may form a part of the control circuitry of the electric wheel hub motor. This further printed circuit board may also be toroidal.

Where two printed circuit boards are used, said printed circuit board and further printed circuit board may be arranged substantially in parallel planar relationship and electrically connected together. One may carry the power circuitry and the other the control circuitry.

The rotor of the motor may comprise a plurality of magnets that are supported at circumferentially spaced locations around the outside of an outer peripheral surface of the stator, an air gap being defined between the magnets and the stator.

The rotor of the motor may be supported by a pair of axially spaced apart bearing assemblies that are fixed to the spindle. The bearing assemblies may be located within the periphery of the stator.

The bearing races may each comprise an inner race, an outer race and a plurality of bearings connecting the inner race to the outer race. The bearings may comprise ball bearing or roller (needle) bearings.

The inner and outer races may be fixed to the spindle and the rotor respectively, although the inner races may be free to slide along the spindle for assembly and be located in position when in use by adjacent parts of the completed hub assembly so as to locate the rotor axially relative to the spindle as well as locating the rotor radially.

The rotor may comprise a radially extending main body having a central opening through which the spindle passes, and an inner support rim that extends away from a location at or close to an innermost circumference of the main body so that it extends axially along the spindle to pass between the power and drive circuitry and the spindle, the two bearing assemblies being secured to the inner peripheral rim of the rotor.

The two bearing assemblies may be located towards respective ends of the inner peripheral rim.

The main body of the rotor may comprise a planar disc, which may be cut away in places to reduce weight. The main body may define a plurality of fixing points for the sun gear of the epicyclic gearbox.

The sun gear may engage a set of planetary reduction gears of the gearbox that are supported by a gear carrier, the gear carrier for these planetary gears being fixed to the spindle in the driving direction to prevent rotation of the carrier around the spindle.

An optional clutch, such as a Sprag clutch, may be provided to permit movement of the gear carrier relative to the spindle in the other, non-driving, direction to allow freewheeling when the motor is not being powered.

Alternatively the carrier for the planetary gears may be fixed relative to the spindle to prevent rotation in both directions. This may enable, for instance, the hub assembly to function as a generator and allow for regenerative braking.

By drive direction we generally mean the direction in which the hub of the hub assembly is rotated by the motor to drive the vehicle in a forward direction.

The gear carrier may be located on the opposite side of the planetary gears to the rotor main body. The planetary gears may in turn engage with a ring gear secured to, or integral with, an inner face of the hub or a cover plate that connects to and forms a part of the hub.

The planetary gears may each comprise a stepped reduction planetary gear, with a portion of each planetary gear that engages the sun gear having more teeth than a portion of the planetary gear that engages the ring gear. In effect each planetary gear may comprise two gears connected rigidly together on a common axle.

The use of the stepped gears allows the overall diameter of the epicyclic gearbox to be kept compact whilst achieving a relatively high overall gear ratio, preferably between about 7:1 and about 13:1. A most preferred range is between 7.74:1 and 12.5:1.

The rotor may also include an outer peripheral rim that projects away from a region at or close to the outermost edge of the main body so that it overhangs an outer peripheral face of the stator, the outer peripheral rim carrying the plurality of rotor magnets that interact with a magnetic field generated by the stator when the motor is in operation.

The outer peripheral rim may be located close to an inner surface of the wheel hub of the wheel assembly.

The rotor main body and the two rims may comprise a single pressed component which may be produced using a deep draw process starting with a flat blank.

Locating the rotor using bearings that are secured to the spindle at locations within the periphery of the stator and within the periphery of the power and control circuitry ensures the overall width of the hub assembly can be kept low whilst at the same time providing a stable support for the rotor.

The rotor main body may be sandwiched between the stator and the gearbox and the main body may be located approximately midway along the spindle of the hub assembly.

The stator may be secured to the spindle by a carrier located towards one end of the spindle. The carrier may in turn support a bearing assembly that supports the wheel hub, allowing the wheel hub to rotate around the wheel hub. The stator may be supported only on one side, opposite the side that the rotor main body faces.

In a preferred arrangement, in addition to supporting the stator in between the inner peripheral rim and outer peripheral rim of the rotor (where provided), the carrier may also support the power and control circuitry relative to the spindle.

The spindle may comprise a metal component, preferably aluminium, and may provide a path for the transfer of heat that builds up in the power circuitry and stator to pass to the outside of the hub.

Where two circuit boards are provided, the board nearest to the carrier preferably carries the power circuitry. The other board, carrying the control circuitry, may include an angular position sensor that detects the angular position, and hence rotational movement, of the main body of the rotor. A magnet may be secured to the main body of the rotor for example and the sensor may be a Hall Effect sensor that detects the passing of the magnet. More than one magnet may be provided, to allow a higher resolution position signal to be output from the sensor, and similarly more than one Hall Effect sensor may be provided.

In a most preferred arrangement, the power and support circuitry may comprise one or more printed circuit boards that are each overhung from the carrier in the space between the stator and the inner peripheral rim of the rotor. One or more bolts may pass through the circuit board or each circuit board and engage in respective threaded bores in the carrier.

The carrier may comprise a spider having a central bore that enables the spider to be secured to the spindle, for example by a press fit connection, each leg of the spider providing a locating point for the stator or the circuitry. The carrier may be secured to the spindle close to one end of the spindle, outboard of the bearings that support the rotor.

The carrier may be fixed directly to the stator that in turn supports the circuitry, or may be fixed directly to the circuitry which in turn supports the stator. Or the carrier may be fixed directly to both the stator and the circuitry.

The hub may comprise a two-part shell, each part having a radially extending wall and supported by a bearing assembly. The two parts of the shell when in use are connected together to form a protective cover for the motor stator, rotor, control circuitry and the gearbox from exposure to the elements. In addition, of course, the shell provides the connection from the hub to the rim of a wheel when built up into a completed wheel.

The spindle of the hub assembly may have a nominal axial width of between 60 mm and 150 mm. A hub assembly width of 74 mm may be provided. This allows the hub assembly to fit between the arms of a fork on a range of bicycles without modification of the spacing between the fork ends. This dimension is commonly referred to as the outer lock nut dimension of the hub, albeit the spindle of the present invention does not have outside lock nuts and instead has a pre-set length determined by radial shoulders formed towards each end of the spindle which in use contact the inner faces of the fork ends or dropouts of a bicycle or equivalent supporting locations of a vehicle such as a wheel chair or mobility scooter.

The hub assembly may include means for fixing the spindle to a support part of a vehicle, such as a front fork of a bicycle whereby the spindle is restrained from rotating relative to the support part of the vehicle.

The fixing means may include a set of fixing nuts, each end of the spindle being provided with a threaded extension portion that is complementary to the thread of the nuts, the diameter of the threaded portion being sized to pass through the standard fork ends located at the end of a front fork of a bicycle. This will allow the hub to be retrofitted to a range of different bicycles with little or no modification of the forks. This threaded portion may extend beyond the nominal width of the hub assembly, typically by between 10 mm and 20 mm.

The threaded ends of the spindle may each have a diameter of between 7 mm and 20 mm, with an 8 mm diameter or 15 mm diameter being preferred for use of the hub assembly with a bicycle.

Where the electric drive wheel assembly is to be fitted to a wheel chair or mobility scooter the spindle may be secured to the vehicle at one end only, in which case only a single fixing nut may be required and a threaded extension may be provided on one end of the spindle only.

The hub may have an outer diameter of less than 150 mm, and preferably less or equal to 140 mm. This small diameter allows the hub to be fitted within a wide range of wheel rims and, by remaining compact, the weight of the hub assembly can be kept relatively low.

The output of the motor may be limited to an average power of about 250 watts but the motor output may have a peak power that exceeds 250 watts.

According to a further aspect of this invention there is provided a vehicle having a wheel hub arranged to be driven by an electric motor, said hub housing said electric motor which includes a stator and a rotor rotatable about said stator, wherein power circuitry and control circuitry for the electric motor is located within the periphery of said stator. Preferably, said vehicle has at least one drive wheel, said wheel including a spindle supporting said hub, and support means extending to a peripheral rim, said hub having located therein said electric motor comprising a brushless DC motor, and an epicyclic reduction gear assembly arranged to be driven by said brushless DC motor to rotate said hub.

Advantageously, the brushless DC motor has power derived by power circuitry including an inverter or a pulse width modulator (PWM) circuit mounted on toroidal mounting means located about said spindle and completely within the confines of said stator.

Preferably, said mounting means is a printed circuit board (PCB).

Conveniently, commutation is provided by a micro-controller mounted on said printed circuit board or on a further toroidal printed circuit board, also located about said spindle and completely within the confines of said rotor.

Preferably, where two printed circuit boards are used, said printed circuit board and further printed circuit board are arranged substantially in parallel planar relationship and electrically connected together.

Advantageously, the printed circuit board and said further printed circuit board are each double sided with components mounted on both major planar surfaces thereof.

The hub may house commutation circuitry for the motor comprising a micro-controller which may be mounted on said printed circuit board for the power circuitry or on a further toroidal printed circuit board, also located about said spindle and completely within the confines of said rotor. The micro-controller may form a part of the control circuitry of the electric wheel hub motor. This further printed circuit board may also be toroidal.

Where two printed circuit boards are used, said printed circuit board and further printed circuit board may be arranged substantially in parallel planar relationship and electrically connected together. One may carry the power circuitry and the other the control circuitry.

The rotor of the motor may comprise a plurality of magnets that are supported at circumferentially spaced locations around an outer peripheral surface of the stator, and air gap being defined between the magnets and the stator.

The rotor of the motor may be supported by a pair of axially spaced apart bearing assemblies that are fixed to the spindle. The bearing assemblies may be located within the periphery of the stator.

The bearing races may each comprise an inner race, an outer race and a plurality of bearings connecting the inner race to the outer race. The bearings may comprise ball bearing or roller (needle) bearings.

The inner and outer races may be fixed to the spindle and the rotor respectively, although the inner races may be free to slide along the spindle for assembly and be located in position when in use by adjacent parts of the completed hub assembly so as to locate the rotor axially relative to the spindle as well as locating the rotor radially.

The rotor may comprise a radially extending main body having a central opening through which the spindle passes, and an inner support rim that extends away from a location at or close to an innermost circumference of the main body so that it extends axially along the spindle to pass between the power and drive circuitry and the spindle, the two bearing assemblies being secured to the inner peripheral rim of the rotor.

The two bearing assemblies may be located towards respective ends of the inner peripheral rim.

The main body of the rotor may comprise a planar disc, which may be cut away in places to reduce weight. The main body may define a plurality of fixing points for input parts of the gearbox.

The rotor may also include an outer peripheral rim that projects away from a region at or close to the outermost edge of the main body so that it overhangs an outer peripheral face of the stator, the outer peripheral rim carrying the plurality of rotor magnets that interact with a magnetic field generated by the stator when the motor is in operation.

The outer peripheral rim may be located close to an inner surface of the wheel hub of the wheel assembly.

The rotor main body and the two rims may comprise a single pressed component which may be produced using a deep draw process starting with a flat blank.

Locating the rotor using bearings that are secured to the spindle at locations within the periphery of the stator and within the periphery of the power and control circuitry ensures the overall width of the hub assembly can be kept low whilst at the same time providing a stable support for the rotor.

The rotor main body may be sandwiched between the stator and the gearbox and the main body may be located approximately midway along the spindle of the hub assembly.

The stator may be secured to the spindle by a carrier located towards one end of the spindle. The carrier may in turn support a bearing assembly that supports the wheel hub, allowing the wheel hub to rotate around the spindle. The stator may be supported only on one side, opposite the side that the rotor main body faces.

In a preferred arrangement, in addition to supporting the stator in between the inner peripheral rim and outer peripheral rim of the rotor (where provided), the carrier may also support the power and control circuitry relative to the spindle.

The spindle may comprise a metal component, preferably aluminium, and may provide a path for the transfer of heat that builds up in the power circuitry and stator to pass to the outside of the hub assembly.

Where two circuit boards are provided, the board nearest to the carrier preferably carries the power circuitry. The other board, carrying the control circuitry, may include an angular position sensor that detects the angular position, and hence rotational movement, of the main body of the rotor. A magnet may be secured to the main body of the rotor for example and the sensor may be a Hall Effect sensor that detects the passing of the magnet. More than one magnet may be provided, to allow a higher resolution position signal to be output from the sensor, and similarly more than one Hall Effect sensor may be provided.

In a most preferred arrangement, the power and support circuitry may comprise one or more printed circuit boards that are each overhung from the carrier in the space between the stator and the inner peripheral rim of the rotor. One or more bolts may pass through the circuit board or each circuit board and engage in respective threaded bores in the carrier.

The carrier may comprise a spider having a central bore that enables the spider to be secured to the spindle, for example by a press fit connection, each leg of the spider providing a locating point for the stator or the circuitry. The carrier may be secured to the spindle close to one end of the spindle, outboard of the bearings that support the rotor.

The carrier may be fixed directly to the stator which in turn supports the circuitry, or may be fixed directly to the circuitry which in turn supports the stator. Or the carrier may be fixed directly to both the stator and the circuitry.

Preferably, said vehicle is a bicycle, conveniently a folding bicycle, and said drive wheel is the front wheel thereof. The vehicle may alternatively be a wheelchair, scooter, or a mobility scooter.

Advantageously, where the vehicle is a bicycle the vehicle may include a pannier mounted over the front wheel, said pannier being arranged to contain at least one of a battery, a battery charger, and control electronics for the battery charger.

Conveniently, the pannier is detachable from the bicycle. It may, for example, be secured to a fixing device secured to a head tube of the bicycle.

The vehicle may include a supplementary controller that is fixed to the vehicle and includes at least one input port for electrical connection to the battery and at least one output port for connection to the hub. The controller may provide some of the control between the different parts of the system, e.g. between the hub and the battery and the battery controller and may include a processor which is capable of outputting a multiplexed signal suitable for transmission over a CAN bus.

The supplementary controller may include a diagnostic circuit that in use monitors the operation of one or more parts of the system, such as the hub motor, and provides diagnostic information to the user. It may, for example, include one or more lights that illuminate to indicate faults or a requirement to service the system. The provision of a supervisory controller allows a mix and match approach to the overall system, where batteries and hubs can be swapped out and replaced as required.

The controller may include a further port for connection to a front and/or rear light of the vehicle, allowing the battery to power the light as well as the hub.

The controller may be conveniently fixed to the frame of the bicycle, for example to the head tube of the bicycle.

The controller may include a further port for connection to a user operable switch whereby the user can control at least a part of the operation of the hub and or a Where a torque sensor or force sensor is provided, the controller may include an input for receiving signals from the torque sensor.

The controller may be connected to the hub by a single multi-core cable, each core of which carries one of the following signals:
Vehicle Speed
User (e.g. rider) applied Torque or force
Pedal speed
Power to the hub circuitry from the battery
Return connection from the hub to the battery or to an earth point Most preferably the cable has four cores; two carrying power, one carrying multiplexed control signals from the supervisory controller to the control circuitry of the hub indicative of at least one of vehicle speed, pedal speed and user applied torque or force, and the other receiving control signals transmitted from the control circuitry of the hub.

The supplementary controller may include a processor for generating multiplexed signals for transmission to the hub and for receiving multiplexed signals from the hub.

Conveniently, a speed sensor may be provided to determine the pedal speed of the bicycle, and a speed control cable extends therefrom to said electric motor to control the motor speed. In place of this cable, the signals may be multiplexed by the supplementary controller and transmitted across one conductor of the multi-core cable.

In the event that a non-zero speed is detected, or the speed exceeds some predefined non-zero value, or the acceleration as determined from the measured speed exceeds a predefined level, the motor may apply an assistance torque. When these conditions are not met no assistance may be provided. The motor therefore does not apply full assistance but instead helps the user-perhaps a wheelchair user or a bicycle rider- to power the wheelchair or bicycle.

The system may include a force sensor or torque sensing means for sensing that the user of the vehicle—e.g. rider of a bicycle, has applied a drive force or torque to the vehicle. The processor of the supplementary controller, where provided, may perform the function of receiving the force signal or torque signal and transmitting the signal to the hub, perhaps multiplexed with other signals.

For example, there may be provided a torque sensor for sensing effort applied to the pedals by a rider. The torque sensor may be associated with a bottom bracket assembly of the vehicle and may include one or more strain gauges.

The hub motor may be configured to provide an assistance torque in the event that the torque applied by the rider meets one or more predefined criteria, and may otherwise not apply any assistance torque. The motor will therefore assist the rider, rather than provide the sole source of motivation for the vehicle.

The hub motor may be configurable to provide a user defined response to an input torque, allowing the user to select a more or lesser amount of assistance and a more progressive or aggressive increase in assistance whenever an increased demand for torque is detected.

In another aspect the invention provides a wheel incorporating a hub assembly of the first aspect of the invention, the wheel comprising a wheel rim, the hub assembly and a plurality of spokes connecting the wheel rim to the hub assembly. There may be between 16 and 40 spokes in the wheel.

The wheel may have an outer wheel rim diameter of between 20 inches (51 cm) and 28 inches (71 cm) and may be suitable for use in a bicycle or a wheel chair. Preferred diameters for the wheel rim diameter are 20 inches, 24 inches, 26 inches, 27 inches and 650 cc and 700 cc. These sizes correspond to standard wheel sizes for bicycles and wheelchairs.

According to a still further aspect of this invention there is provided an electric drive wheel hub system for location in a hub of a driven wheel of a vehicle including an electric drive hub assembly comprising a motor having a stator and a rotor, said rotor being rotatable about said stator, wherein power circuitry and control circuitry for the motor is located within the periphery of said stator, the system further including a battery and a supervisory controller and a multicore cable that connects the supervisory controller to the electric drive hub assembly.

According to a yet further aspect there is provided a kit of parts for converting an unpowered bicycle, scooter or wheelchair to electric assistance the kit comprising at least two of the following: an electric drive wheel hub assembly according to the first aspect, a battery pack including at least one battery, and at least one cable for connecting the wheel hub to the battery.

The kit may further include at least one of a speed sensor and a torque sensor. One or more cables may be provided for connecting the sensor or each sensor to the hub, either directly or indirectly.

The electric drive wheel hub assembly may form a part of a front wheel for a bicycle.

The kit may include a supervisory controller that forms a junction box for connecting the parts of the kit together.

By adding the kit of the invention to a normal unassisted bicycle, a fully electric assist bike is provided that can assist a rider to make journeys in a more comfortable and less tiring manner.

Preferably said hub has located therein said electric motor comprising a brushless DC motor, and an epicyclic reduction gear assembly arranged to be driven by said brushless DC motor to rotate said hub.

Figure 2:
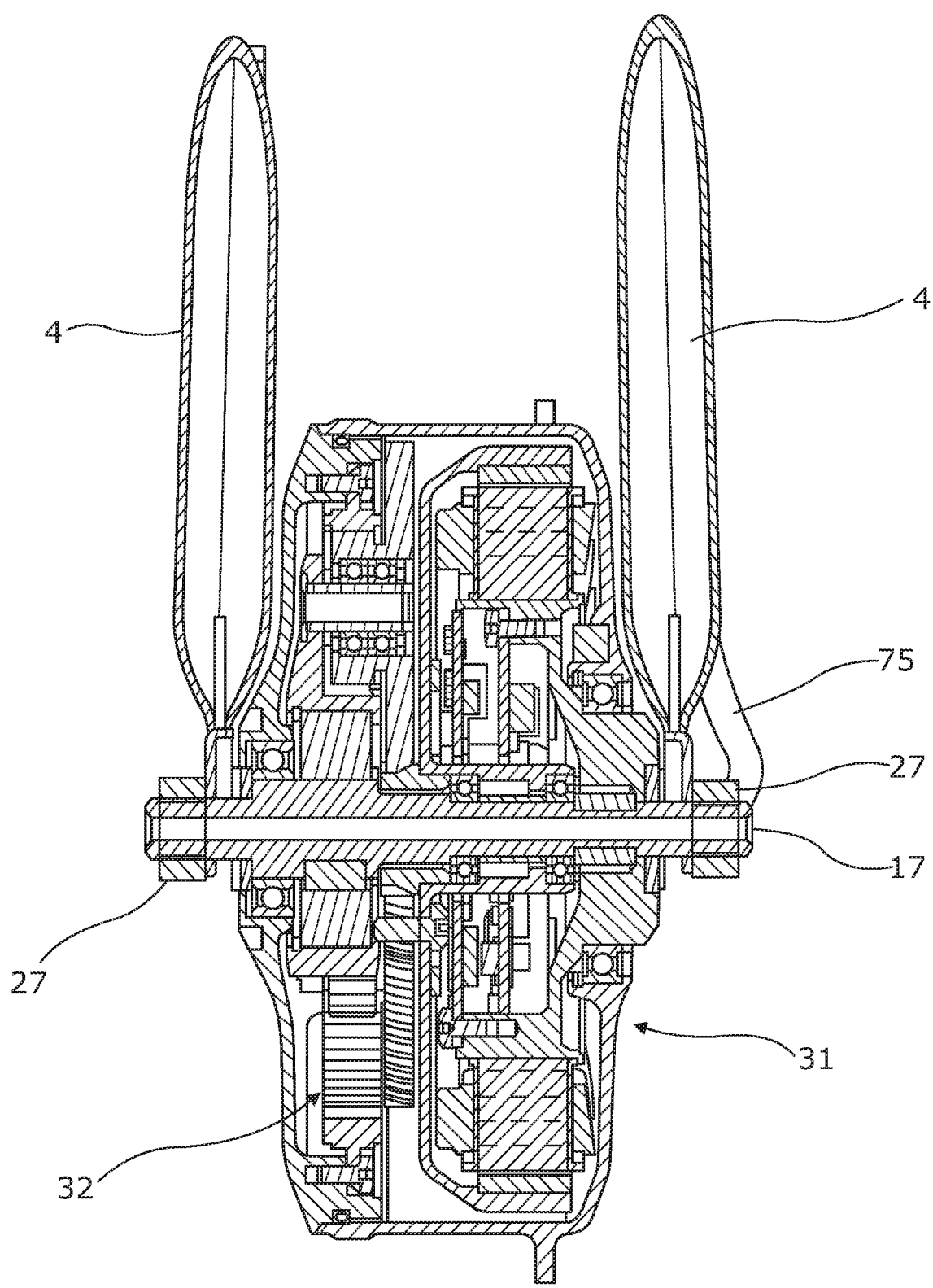
Figure 3:
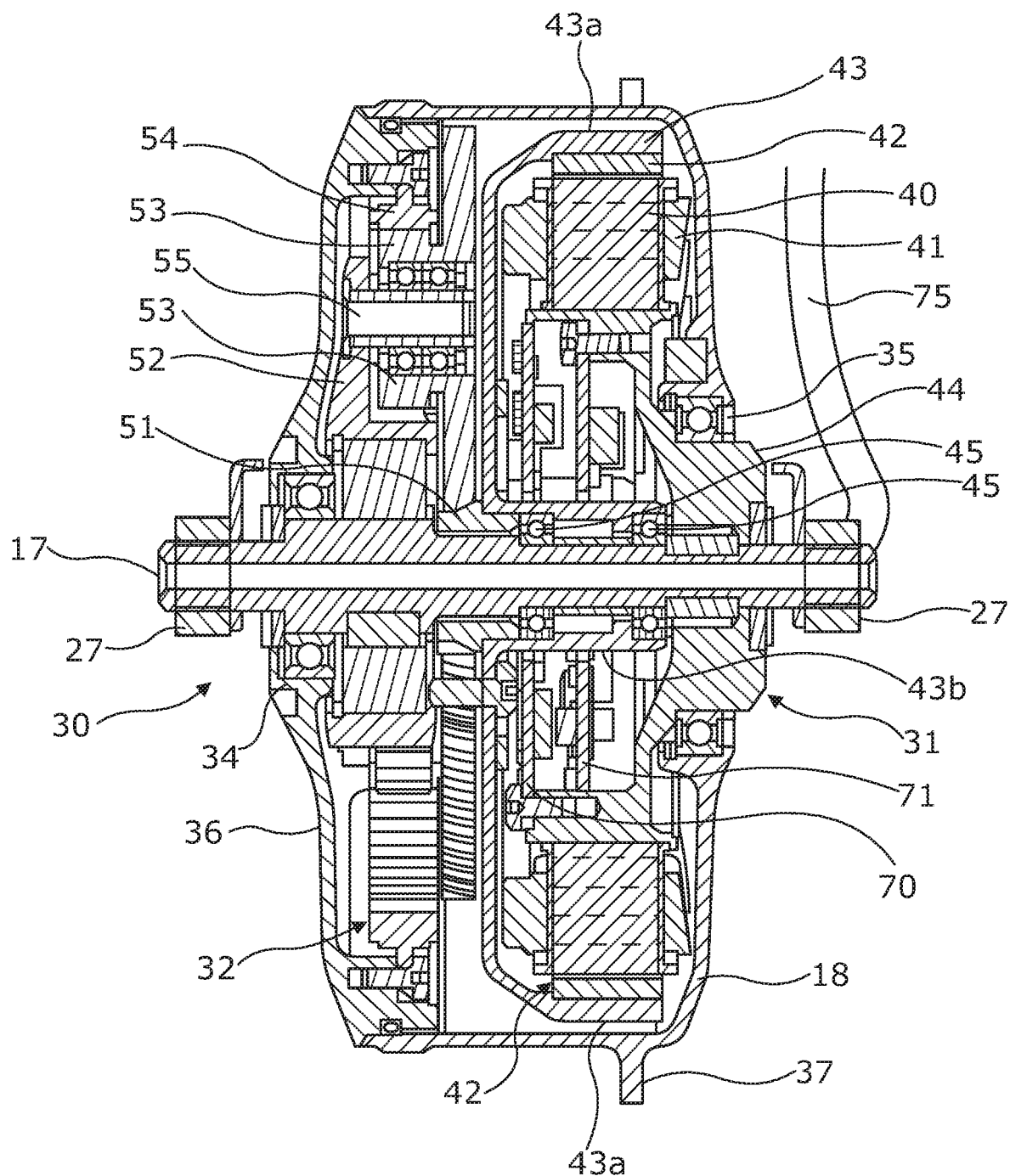
Figure 4:
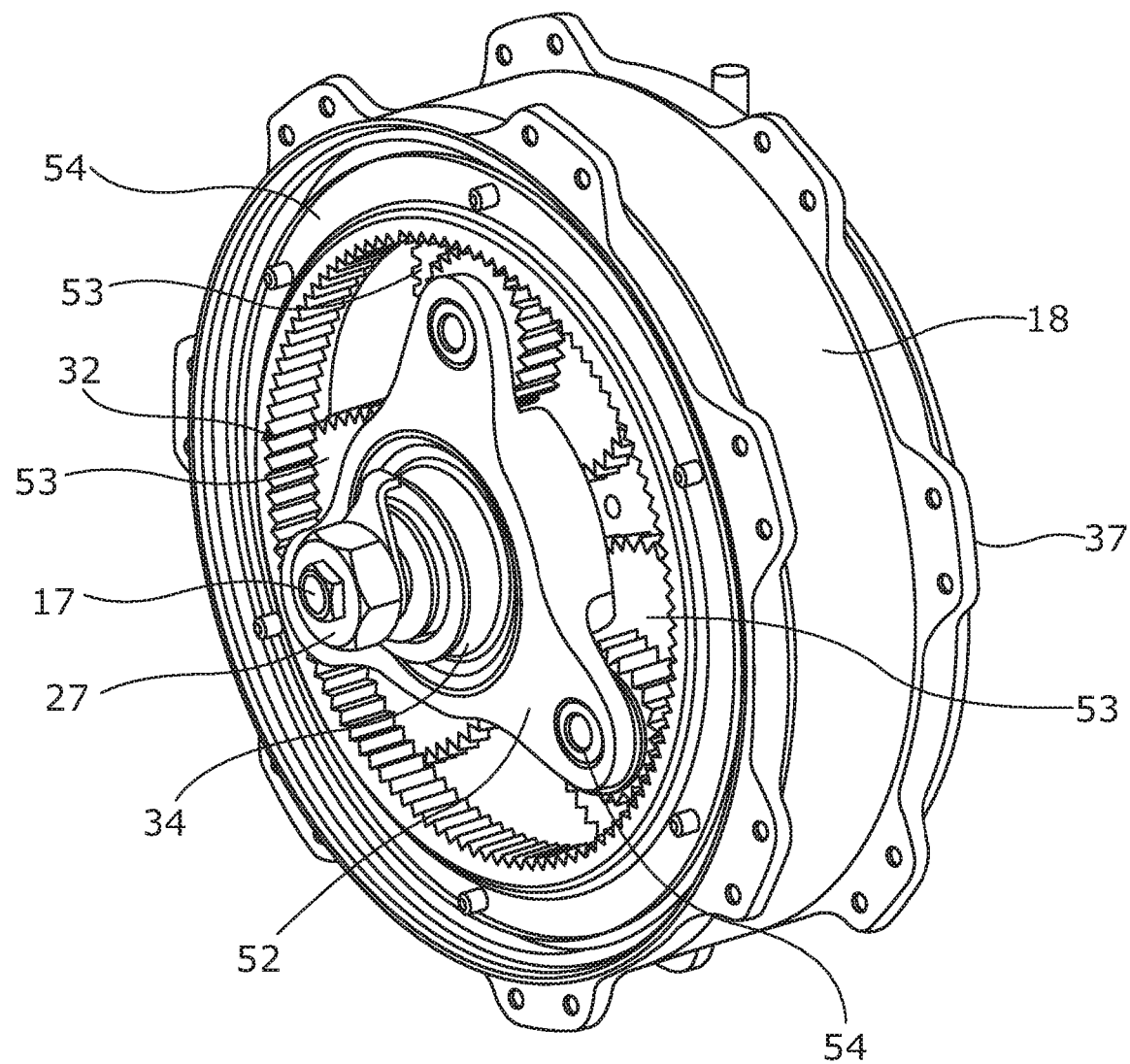
Figure 5:
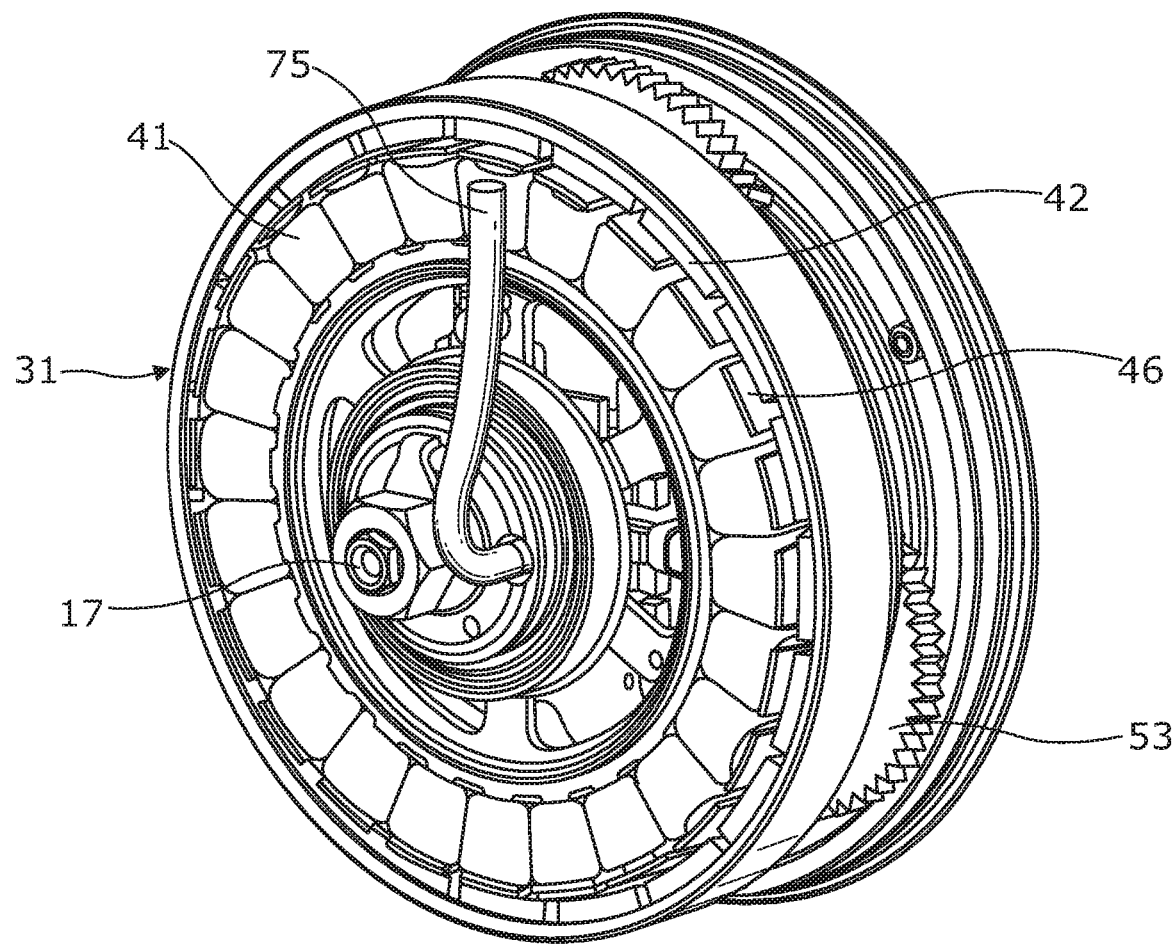
Figure 6:
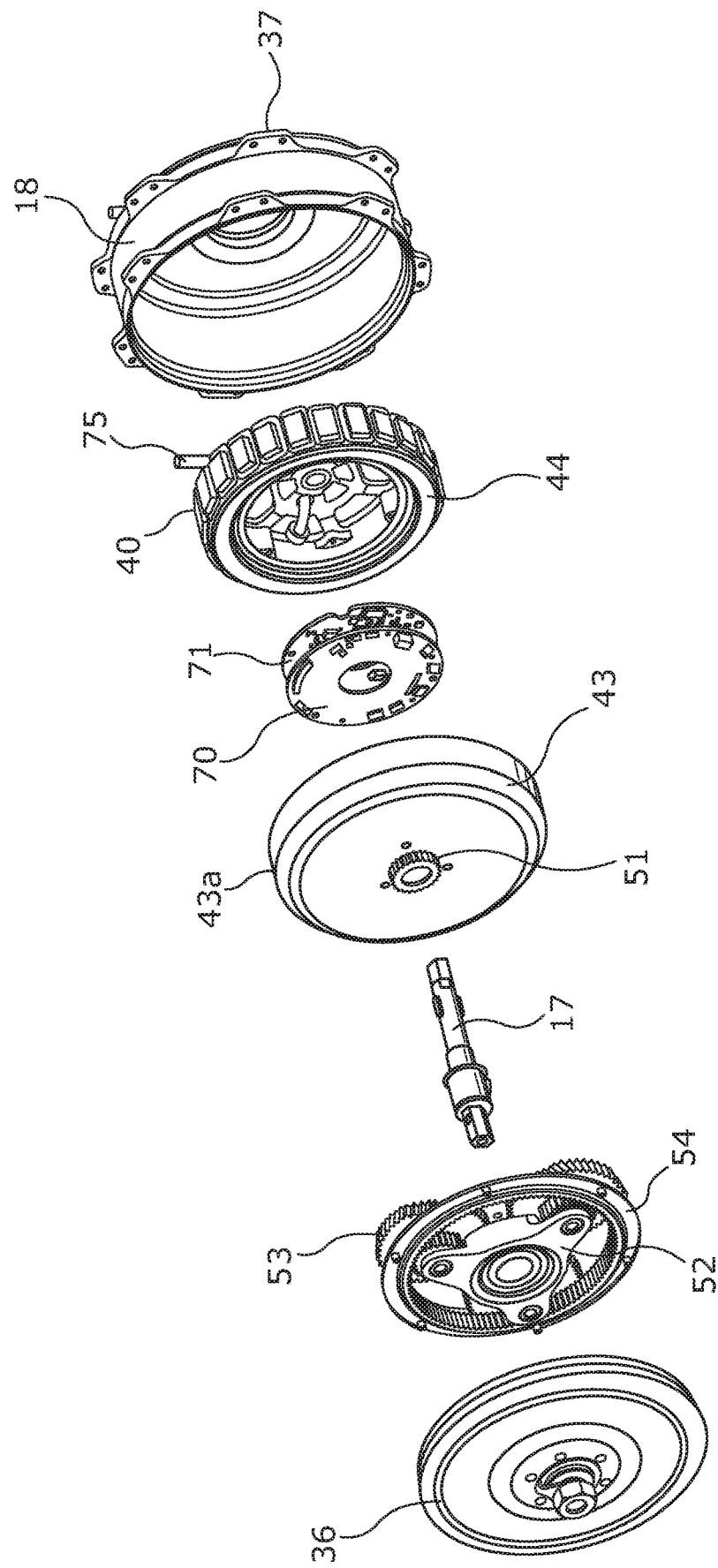
Figure 7A:
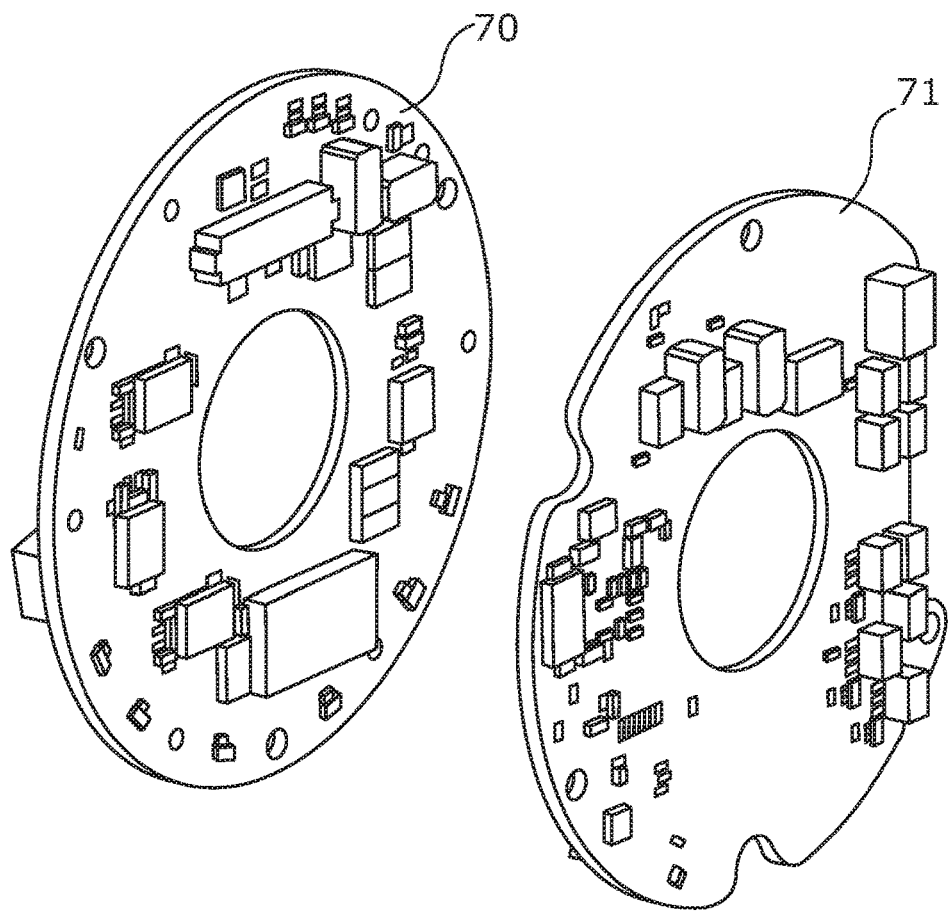
Figure 7B:
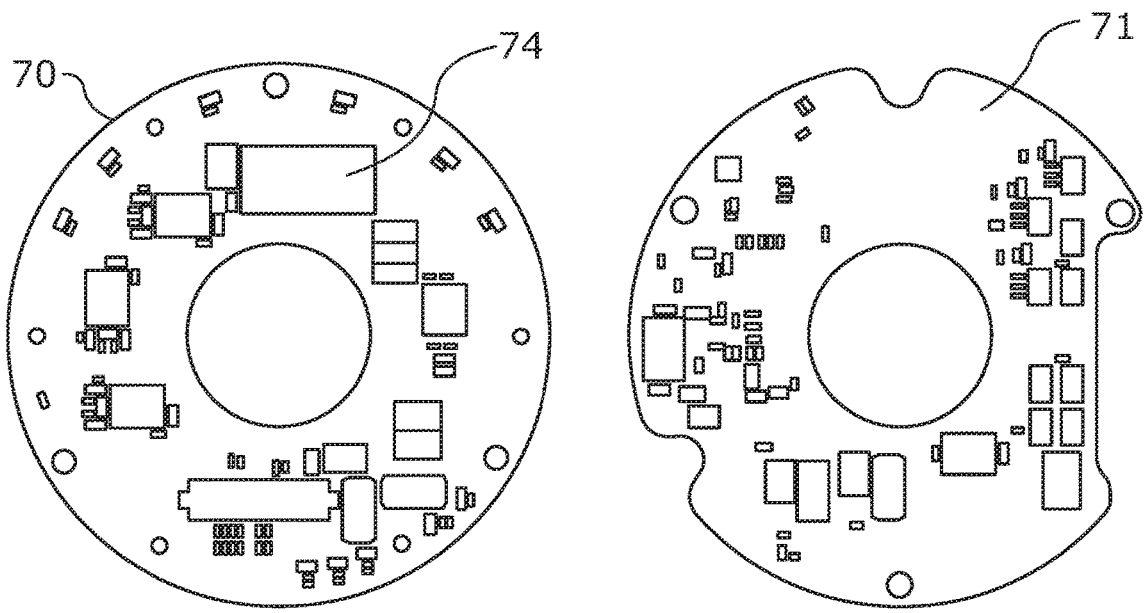
Figure 7C:
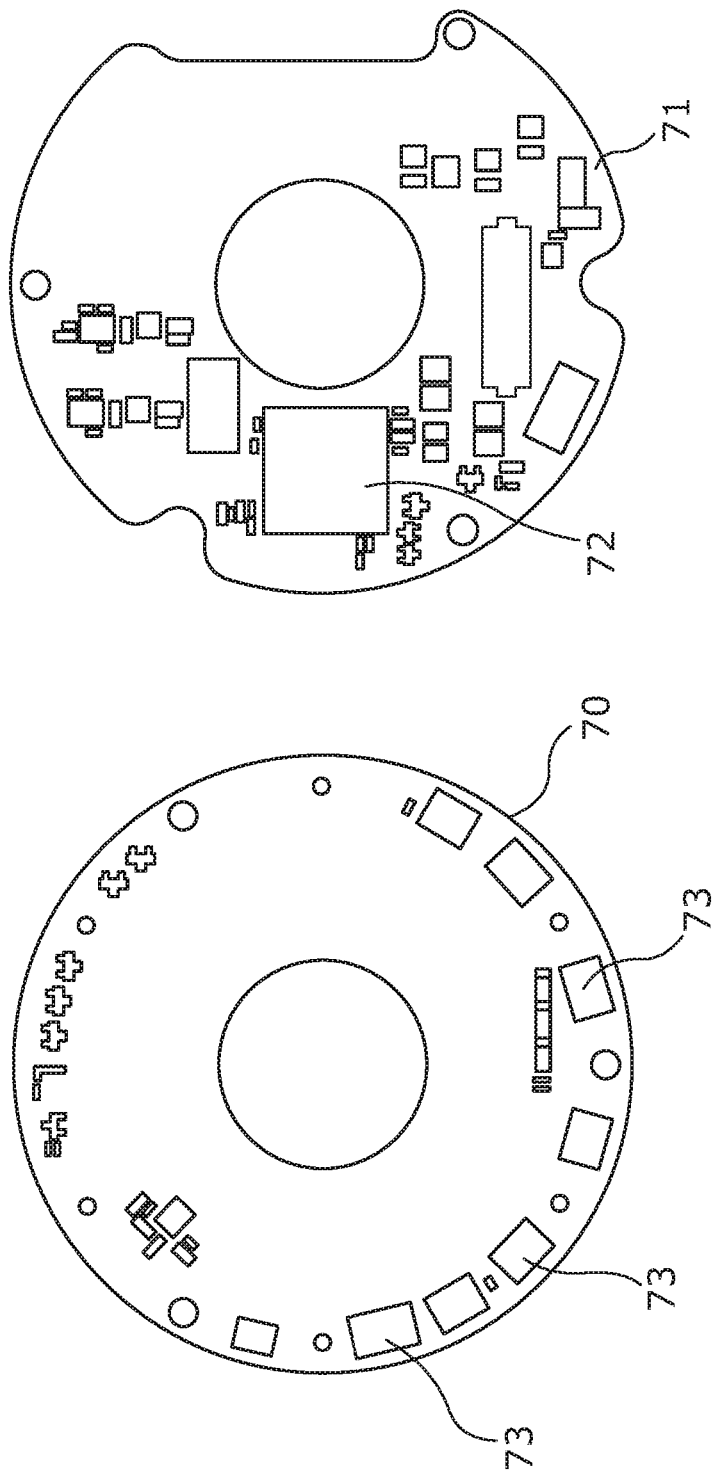

The invention will now be described, by way of example, with reference to the accompanying drawings, in which:

FIG. 1 shows a side view of a bicycle in accordance with one application of this invention, FIG. 2 shows a cross-sectional view of an electric motor used in this invention housed in a hub and located between front forks of a bicycle, FIG. 3 shows a partial cross-sectional view of an electric drive hub system including a motor and epicyclic reduction gear assembly employed in this invention, FIG. 4 shows a perspective view of the reduction gear assembly, FIG. 5 shows a perspective view of the electric motor, rotor and stator, housed in a hub, FIG. 6 shows an exploded view of an electric drive wheel hub assembly in accordance with this invention, FIG. 7(a) shows a perspective view of a pair of printed circuit boards used in this invention, FIG. 7(b) shows a front view of each of the printed circuit boards shown in FIG. 7(a), and FIG. 7(c) shows a rear view of the printed circuit board shown in FIG. 7(a).

In the Figures like reference numerals denote like parts.

A pedal bicycle shown in FIG. 1 has a frame 1 including a front stem 2 through which is a shaft extending from a pair of handlebars 3 to a pair of front forks 4 which locate therebetween a front wheel 5 having an electric drive hub system 30 comprising a hub 18 which houses a hub motor 31 and epicyclic reduction gear assembly 32 (see FIGS. 2 and 3). Toward the rear of the frame are a pair of rear forks 6 and limbs 7 joined together to form a location for an axle 8 of a rear wheel 9. The rear wheel has a rear sprocket 10 that is driven by a chain 11 mounted on a chain wheel 12 driven by pedals 13 which are each interconnected to the chain wheel by crank 14. The bicycle has a seat 15 for a rider. Mounted on the stem 2 is a pannier 16 which is arranged to be detachable from the bicycle. Although the pannier 16 is, preferably, located on the stem 2 for stability, the pannier may alternatively be connected to the handlebars and/or the front forks 4. The pannier is arranged to house a power source including a battery, a battery charger and charger control electronics (not separately shown) which is connected by a multi-core cable 75 (not shown in FIG. 1) to the hub motor 30. An on-off switch and a speed control throttle and pedal speed sensor (not separately shown) may be provided on the bicycle or in the pannier. The bicycle may also be provided with a torque sensor for sensing the effort applied to the pedals 13 by a rider which, in combination with the pedal speed sensor determining the rotational speed of the pedals, may be used to supply input signals to control logic to determine when motive power is or is not required from the hub motor.

The front wheel 5 has a spindle 17 acting as an axle for supporting the wheel between the front forks 4 and rotatable about the spindle 17 is the hub 18 providing a radial inner end location for support means which may be, for example, spokes 19 which, at their radial outer end, are connected to a rim 20 of the wheel 5, the rim locating a tyre 21. Similarly, the axle 8 of the rear wheel 9 supports a hub 22 locating a radial inner end of rear spokes 23 and a rear rim 24 locating a tyre 25.

Referring to FIG. 2, the partial cross-sectional view of the electric motor 31 is shown located between the front forks 4 and the wheel (not shown in FIG. 2) is mounted between the forks by spindle 17 and held in position by securing nuts 27.

As shown in FIG. 3, the electric drive hub system 30, including the electric motor, that is hub motor 31 and the epicyclic reduction gear assembly 32, is housed in the hub 18 within the space of the front forks 4.

Located about the spindle 17 are roller ball bearing races 34 and 35, the race 34 rotatably supporting a dished cover 36 for the epicyclic reduction gear assembly 32 that forms a removable end cover of the wheel hub 18. The bearing assembly 35 supports the main hub portion 18. Within the hub 18 is located the hub motor 31. The wheel hub 18 has peripherally spaced arms 37 within each of which are apertures for locating a radially inner end of the spokes 19.

The hub motor 31 has soft iron stators 40 and a series of stator windings 41 which may be three or five phase type, but, if three phase, they consist of three sets of six coil pairs circumferentially spaced around the stator to provide an eighteen pole machine. The stator windings may be wound in star or delta configuration, as is known per se.

A permanent magnet rotor has sixteen alternate north-south permanent magnets 42 arranged around the periphery of a rotor body 43 that is secured to a sun gear 51 of the epicyclic reduction gear assembly 32. The stators 40 are located within a stator housing 44 or carrier.

In more detail, the magnets 42 are supported by an outermost peripheral rim 43a of the rotor which projects from a main body 43 of the rotor. The main body 43 comprises a disc having a hole at the centre through which the spindle passes freely. An inner peripheral rim 43b projects from the disc and extends along the spindle to occupy a space between the circuit boards and the spindle 17. Two spaced apart bearing assemblies 45 support the rotor relative to the spindle, located towards opposite ends of the inner peripheral rim. The main body and inner peripheral rim together form a hub of the rotor.

The epicyclic reduction gear assembly comprises the sun gear 51 and a planet gear carrier 52 rotatably carrying planetary reduction gears 53, the smaller diameter portion of the gear 53 engaging with internal teeth of an annular planet gear 54. The larger diameter teeth of planetary reduction gears 53 engage with the sun gear 51. Each of the planet gears 53 is mounted on an axle 55 and the planet gear carrier 52 is held stationary so that as hub 43 of the hub motor 31 rotates so it rotates sun gear 51 which is meshed with the planetary reduction gears 53 that, in turn, rotate annular planet gear 54 and, hence, wheel cycle hub 18, 36.

It will, therefore, be understood that the EMF produced by the stators 40 commutatingly provides electromagnetic repulsive motive force to the rotor magnets 42 to rotate the main body 43 of the hub. This makes the sun gear 51 rotate, in turn rotating the planetary gears 53 and the ring gear. The gearing of the planetary reduction gears 53 may increase the motor speed by a ratio of 3:1, 4:1 or 5:1 in comparison to direct drive by the hub motor. Such gearing significantly improves both efficiency and power output of the hub motor for a given motor size. Thus, the disadvantage of direct drive motors running below their efficient speed for both power and electrical energy efficiency is overcome and a smaller hub motor may be employed due to the gearing.

To drive the brushless DC hub motor, current from a battery located in the pannier 16 is converted from DC to AC by an inverter such as by pulse width modulated (PWM) circuitry, whereby the pulse width of the mark-space ratio of the PWM waveform controls the speed of the hub motor.

Hitherto, it has been known to provide the PWM components and control electronics on the frame or luggage rack positioned over the rear wheels of a bicycle or in a pannier fitted between the handlebars. However, such a known arrangement creates problems and introduces poor efficiencies due to the high current and high switching frequency being conducted to the hub motor stator windings by cables over a distance of 1-1.5 metres.

Accordingly, in this invention the PWM components and control electronics are located on one or more printed circuit boards which are located within the peripheral confines of the stator. Control logic and communication circuits, together with temperature sensors and speed and position sensors, are all located on the aforesaid printed circuit board(s).

Thus, referring to FIGS. 7(a)-7(c), a power printed circuit board 70 contains the PWM integrated circuits and printed circuit board 71 contains the control and logic circuits. The control logic printed circuit board 71 mounts control logic integrated circuit 72 and output power transistors 73 are located around the periphery of printed circuit board 70 to minimise conductor length to the stator windings. The printed circuit boards 70 and 71 are interconnected by a pair of multi-pin connectors 74. The printed circuit board 71 has an outer edge thereof partially cut away to facilitate the multi-core cable 75 from the pannier 16 to feed to the printed circuit board 70. The multi-core cable for power and control of the hub motor is contained in four wires, namely positive and negative power, and a control area network BUS, high and low.

Although two printed circuit boards are shown in the exemplary embodiment, it is to be understood that the components may be mounted on a single printed circuit board where possible.

It will, thus, be seen that in the present invention the power inverter (or PWM), power drive circuits and logic control circuitry is mounted on one or more printed circuit boards located within the hub, thereby maximising electrical efficiency and space utilisation.

By placing the inverter/PWM and logic circuits within the hub, a significant reduction in cable length between the inverter/PWM and stator winding is achieved. In the present invention the leads of the output phase transistor switches are connected directly to the stator windings, being positioned around the edge of the power printed circuit board 73.

The control logic is programmed into the integrated circuit 72 which is mounted on the logic printed circuit board 71 with the position sensors, current and voltage sensors. By controlling the integrated circuit 72 by a computer area network logic BUS, the number of wires into the hub is reduced from twelve or fourteen, down to four. The battery and charger, by being located within the pannier, enables the pannier to be de-mounted for safekeeping or for charging the battery at a convenient location, such as at home or in an office. Signals to and from the hub flow along the multi cable lead 75 which is connected at its free end to a supplementary controller 80 secured to the vehicle. In this example the supplementary controller is fixed to the head tube 2 of the bicycle below the pannier 16. The supplementary controller forms a junction box that interconnects the hub, the battery and battery controller and the torque/pedal speed sensors.

The battery may be any of 24, 36, 42 or 48 volts.

The hub motor 31 may be of relatively low power in the order of 200-500 watts, but may be greater, e.g. 800 watts, if required.

In the above described embodiment, the hub motor is located in the front wheel of a bicycle and substitutes the conventional wheel hub, thereby allowing the spokes to be mounted onto the outer edge of the hub and support the front wheel rim of the bicycle.

However, the hub motor may be located in the hub of the rear wheel or arrange to drive a chain to the rear wheel. The control circuitry may be arranged to provide a torque boost to a rider by monitoring the pedal force input of the rider and, if required, to supply boosting torque.

By reducing the number of electrical cable connections, the present invention has the advantage of reducing the amount of required space for the cables and reduces electrical interference.

The present invention has particular utility for compact or folding bicycles, but it will be understood by those skilled in the art that the invention may be used advantageously in situations where space and/or access is limited and where electrical high frequency interference is to be minimised.

The invention claimed is:

1. An electric drive wheel hub assembly for an electrically assisted vehicle, the electric drive wheel hub assembly comprising:

a wheel hub housing an electric motor which includes a stator and a rotor rotatable about the stator, power circuitry and control circuitry for the electric motor being located within a periphery of the stator, and the electric motor comprising a brushless DC motor;

an epicyclic reduction gear assembly arranged to be driven by the brushless DC motor to rotate the wheel hub, the wheel hub enclosing the epicyclic reduction gear assembly and the rotor;

at least one drive wheel including a spindle supporting the wheel hub and a support element extending to a peripheral rim; and a carrier comprising a spider having a central bore secured to the spindle at one end of the spindle outside the periphery of the stator, each leg of the spider providing a locating point for the stator or the power circuitry and the control circuitry, the carrier supporting a bearing assembly that supports the wheel hub, and the carrier also supporting the power circuitry and the control circuitry.

2. The electric drive wheel hub assembly as claimed in claim 1, wherein the brushless DC motor is configured to be powered by the power circuitry, including an inverter or a pulse width modulator (PWM) circuit mounted on a toroidal mounting element located about the spindle and completely within the periphery of the stator.

3. The electric drive wheel hub assembly as claimed in claim 2, wherein the toroidal mounting element is a printed circuit board (PCB).

4. The electric drive wheel hub assembly as claimed in claim 3, configured to have commutation provided by a micro-controller mounted on the printed circuit board or on a further toroidal printed circuit board, also located about the spindle and completely within the confines of the rotor.

5. The electric drive wheel hub assembly as claimed in claim 3, wherein the printed circuit board and the further printed circuit board are arranged substantially in parallel planar relationship and electrically connected together.

6. The electric drive wheel hub assembly according to claim 1, in which the rotor of the motor comprises a plurality of magnets that are supported at circumferentially spaced locations around an outer peripheral surface of the stator, an air gap being defined between the magnets and the stator.

7. The electric drive wheel hub assembly according to claim 1, in which the rotor of the motor is supported by a pair of axially spaced apart bearing assemblies that are fixed to the spindle and located within the periphery of the stator.

8. The electric drive wheel hub assembly according to claim 7, in which the rotor comprises a radially extending main body having a central opening through which the spindle passes, and an inner support rim extending away from a location at or close to an innermost circumference of the main body, the inner support rim extending axially along the spindle to pass between the power circuitry and the spindle, the two bearing assemblies being secured to the inner support rim of the rotor.

9. The electric drive wheel hub assembly according to claim 1, in which the stator is secured to the spindle by a carrier located towards one end of the spindle.

10. The electric drive wheel hub assembly according to claim 9, in which the stator is supported only on one side, opposite a side facing a radially extending main body of the rotor.

11. A vehicle having a wheel hub arranged to be driven by an electric motor, the wheel hub housing the electric motor which includes a stator and a rotor rotatable about the stator, power circuitry and control circuitry for the electric motor being located within a periphery of the stator, the electric motor comprising a brushless DC motor, and an epicyclic reduction gear assembly arranged to be driven by the brushless DC motor to rotate the wheel hub, the wheel hub enclosing the epicyclic reduction gear assembly and the rotor;

at least one drive wheel including a spindle supporting the wheel hub and a support element extending to a peripheral rim; and a carrier comprising a spider having a central bore secured to the spindle at one end of the spindle outside the periphery of the stator, each leg of the spider providing a locating point for the stator or the power circuitry and the control circuitry, the carrier supporting a bearing assembly that supports the wheel hub, and the carrier also supporting the power circuitry and the control circuitry.

12. The vehicle as claimed in claim 11, wherein the brushless DC motor is configured to be powered by the power circuitry, including an inverter or a pulse width modulator (PWM) circuit mounted on a toroidal mounting element located about the spindle and completely within the periphery of the stator.

13. The vehicle as claimed in claim 12, wherein the toroidal mounting element is a printed circuit board (PCB).

14. The vehicle as claimed in claim 13, configured to have commutation provided by a micro-controller mounted on the printed circuit board or on a further toroidal printed circuit board, also located about the spindle and completely within the confines of the rotor.

15. The vehicle as claimed in claim 14, wherein the printed circuit board and further printed circuit board are arranged substantially in parallel planar relationship and electrically connected together.

16. The vehicle as claimed in claim 11, wherein the vehicle is a bicycle and the drive wheel is the front wheel thereof.

17. The vehicle as claimed in claim 16, further comprising a speed sensor and/or a torque sensor, the speed sensor being configured to determine pedal speed of the bicycle, and a speed control cable extending from the speed sensor to the motor configured to control motor speed, the torque sensor being configured to sense effort applied to pedals by a rider.

18. A kit of parts for converting an unpowered bicycle, scooter or wheelchair to electric assistance the kit comprising: an electric drive wheel hub assembly according to claim 1, and at least one of a battery pack including at least one battery, and at least one cable for connecting the wheel hub to the battery.

* * * * *